US005479198A

United States Patent [19]

Kawano et al.

[11] Patent Number: 5,479,198

[45] Date of Patent: Dec. 26, 1995

[54] LIQUID STORING CONTAINER, AN INK JET HEAD CARTRIDGE AND AN INK JET RECORDING APPARATUS

[75] Inventors: Kenji Kawano, Tokyo; Yoshifumi Hattori, Yamato; Masashi Kitani; Etsurou Suzuki, both of Yokohama; Hideo Saikawa, Kawasaki; Masami Kojima, Tokyo; Koichi Tanno; Kenji Aono, both of Kawasaki, all of Japan

[73] Assignee: Canon Kabushiki Kaisha, Tokyo, Japan

[21] Appl. No.: 900,944

[22] Filed: Jun. 17, 1992

[30] Foreign Application Priority Data

Jun. 19, 1991 [JP] Japan .................................... 3-147399

[51] Int. Cl.$^6$ .................................................... G01D 15/16

[52] U.S. Cl. ................................................ 347/86; 347/94

[58] Field of Search ................................ 346/140 R, 25; 347/85, 86, 94, 87

[56] References Cited

U.S. PATENT DOCUMENTS

| | | | |
|---|---|---|---|
| 4,313,124 | 1/1982 | Hara | 346/140 R |
| 4,345,262 | 8/1982 | Shirato et al. | 346/140 R |
| 4,412,232 | 10/1983 | Weber et al. | 346/140 R |
| 4,459,600 | 7/1984 | Sato et al. | 346/140 R |
| 4,463,359 | 7/1984 | Ayata et al. | 346/1.1 |
| 4,500,895 | 2/1985 | Buck et al. | 346/140 R |
| 4,509,062 | 4/1985 | Low et al. | 346/140 R |
| 4,558,333 | 12/1985 | Sugitani et al. | 346/140 R |
| 4,677,447 | 6/1987 | Nielsen | 346/140 R |
| 4,714,937 | 12/1987 | Kaplinksky | 346/140 R |
| 4,723,129 | 2/1988 | Endo et al. | 346/1.1 |
| 4,740,796 | 4/1988 | Endo et al. | 346/1.1 |
| 4,771,295 | 9/1988 | Baker et al. | 346/1.1 |
| 4,785,314 | 11/1988 | Terasawa et al. | 346/140 R |
| 4,992,802 | 2/1991 | Dion et al. | 346/1.1 |
| 5,233,369 | 8/1993 | Carlotta et al. | 346/140 R |

FOREIGN PATENT DOCUMENTS

| | | |
|---|---|---|
| 0375383 | 6/1990 | European Pat. Off. . |
| 0496620 | 7/1992 | European Pat. Off. . |
| 59-098857 | 6/1984 | Japan . |
| 59-123670 | 7/1984 | Japan . |
| 59-138461 | 8/1984 | Japan . |
| 59-207263 | 11/1984 | Japan . |

*Primary Examiner*—Benjamin R. Fuller
*Assistant Examiner*—Craig A. Hallacher
*Attorney, Agent, or Firm*—Fitzpatrick, Cella, Harper & Scinto

[57] ABSTRACT

A liquid storing container storing liquid, therein and having a supply port for supplying the liquid to the outside has flow rate control means having a slit adapted to be closed in a steady state and to be opened for predetermined differential pressure or greater and controlling the flow rate of the liquid supplied from the supply port to the outside, and pressure regulating means disposed more adjacent to the supply port than to the flow rate control means for regulating the pressure of the liquid more adjacent to the supply port than to the flow rate control means.

29 Claims, 14 Drawing Sheets

LIQUID STORING CONTAINER, AN INK JET HEAD CARTRIDGE AND AN INK JET RECORDING APPARATUS

BACKGROUND OF THE INVENTION

1. Field of the Invention

This invention relates to a liquid storing container for storing liquid therein, an ink jet head cartridge comprising an ink tank using the liquid storing container and a recording head for discharging ink, the ink tank and the recording head being connected together, and an ink jet recording apparatus in which the cartridge is removably mountable.

2. Related Background Art

Various containers have heretofore been available as a storing container for storing liquid therein, and above all, in the form of an ink tank for storing ink therein, a method as disclosed in U.S. Pat. No. 4,771,295 (Japanese Laid-Open Patent Application No. 63-87242) wherein an ink tank contains therein a porous member impregnated with ink is known as an ink storing method in an ink jet head cartridge (hereinafter sometimes abbreviated as IJC) comprising a recording head unit and a tank unit (an ink tank) made integral with each other.

However, in this method, for example, a sponge or the like which is a the porous member is impregnated with ink and therefore, it has been difficult to increase the volume efficiency beyond a predetermined level and further, negative pressure in the ink tank becomes greater with a decrease in the ink and a considerable quantity of unusable ink remains in the tank. This has led to the problem that it is difficult to increase the volume efficiency and value of the ink tank. Accordingly, it is difficult to increase the volume efficiency of the ink tank, the downsizing of the ink tank (liquid storing container) for storing a predetermined quantity of usable ink therein is difficult and the downsizing of the recording apparatus also becomes difficult.

On the other hand, to enhance the volume efficiency, it is preferable that ink be not absorbed in the porous member as described previously, but be directly contained. As a construction therefore, there is one as disclosed in U.S. Pat. No. 4,509,062(Japanese Laid-Open Patent Application No. 59-98857) or U.S. Pat. No. 4,500,895 (Japanese Laid-Open Patent Application No. 59-207263) wherein a bladder made of rubber is provided in an ink tank and ink is contained in the bladder.

However, in the case of such construction, the ink in the tank oscillates due to the movement or the like of a carriage as during recording and pressure fluctuation is caused to the ink supplied to a recording head and the quality of printing is deteriorated. Thus, it is still difficult to increase the volume of the tank. Also, negative pressure in the ink tank becomes greater with a decrease in the quantity of ink in the tank, and this also has led to the problem that the quantity of unusable ink remaining in the ink tank increases.

We have zealously carried on our studies to solve these problems and as a result, have proposed flow rate control means functioning also as a valve for stably effecting the supply and controlled shut-off of the ink to the head by a very simple construction. That is, flow rate control means functioning also as a valve comprising an elastic member having a slit adapted to be substantially closed in a steady state and to be opened for predetermined differential pressure or greater is provided in the ink tank. With such a device it is possible to effect the supply of the ink to the recording head with the pressure of liquid which is applied to the nozzle of the recording head being controlled to a predetermined range.

More specifically, a dome-shaped or semispherical partition wall (hereinafter referred to as the slit bladder) having a valve function in which when the difference between internal pressure and external pressure reaches a predetermined value or greater, the wall is deformed to thereby open the slit and for certain differential pressure or lower, the wall restores its original state to thereby close the slit is provided in the ink tank or an ink flow path. An example of an ink jet head cartridge comprising an ink tank of such a construction and a head connected together is shown in FIG. 14 of the accompanying drawings. In FIG. 14, the reference numeral 900 designates a recording head unit, the reference numeral 901 denotes a slit bladder, the reference numeral 902 designates a slit, the reference numeral 903 denotes a sub-tank, the reference numeral 905 designates a main tank, and the reference numeral 906 denotes an ink bag. By such a construction, it has become possible to provide an ink tank of large capacity which can accomplish the stable supply of ink from the ink tank to the head.

We have carried on experiments to further improve the liquid storing container or the ink tank having such a slit bladder and have found the following fact.

Generally, when use is made of a hermetically sealed system ink tank, it is necessary to take care of the solidification of ink. That is, when the ink tank is kept or left at a low temperature which will solidify ink, the deformation of the slit bladder which has produced predetermined negative pressure by the volume expansion by the freezing of the ink inside and outside the slit bladder (the inside: the subtank; the outside: the main tank) is gradually eliminated, and when the pressure in the slit bladder is further heightened by the freezing of the ink, this pressure propagates to the recording head unit, whereby the ink may leak from the nozzle surface of the recording head.

To avoid this, there is a method whereby, for example, a solution having a low solidifying point such as ethylene glycol is mixed with the ink solution to thereby prevent the freezing of the ink at low temperatures. The adoption of such a method, however, may increase the blur of the ink when the ink arrives at paper to thereby deteriorate the quality of printing. To suppress the blur, paper exclusively for use with such method becomes necessary and therefore, an ink tank, a head cartridge, etc. which can sufficiently cope with the preservation of ink at low temperatures have been desired.

SUMMARY OF THE INVENTION

In order to solve the above-noted problems, the present invention has as an object thereof to suppress, by a very simple construction and moreover stably, the volume expansion caused by the solidification of liquid even when the liquid is kept or left at low temperatures which will freeze the liquid, and prevent any pressure change caused by the volume expansion from propagating to the outside of a container and thereby avoid the leakage of ink from the nozzle surface of a recording head particularly when the container is utilized as an ink tank. The present invention also has as an object thereof to provide a liquid storing container an ink jet head cartridge and an ink jet recording apparatus which are so improved. The present invention has as a further object thereof to provide a liquid storing container, an ink jet head cartridge and an ink jet recording apparatus in which the oscillation of ink caused by the vibration of the container is prevented from propagating to a supply port for supplying liquid to the outside.

The liquid storing container of the present invention for achieving the above objects is a container having flow rate control means having a slit adopted to be closed in a steady state and to be opened for predetermined differential pressure or greater and controlling the flow rate of the liquid supplied from said supply port to the outside, and pressure regulating means disposed more adjacent to the supply port than to said flow rate control means for regulating the pressure of the liquid more adjacent to the supply port than to said flow rate control means, or a container having flow rate control means having a slit adapted to be closed in a steady state and to be opened for predetermined differential pressure or greater and controlling the flow rate of the liquid supplied from said supply port to the outside, and a regulation wall disposed with a predetermined clearance from said flow rate control means and more adjacent to the supply port than to said flow rate control means, or a container having flow rate control means having a slit adapted to be closed in a steady state and to be opened for predetermined differential pressure or greater and controlling the flow rate of the liquid supplied from said supply port to the outside, and an oscillation preventing wall disposed on that side of said flow rate control means which is opposed to the supply port for supplying ink from a main tank chamber to said flow rate control means.

The ink jet recording head cartridge of the present invention is a cartridge having a recording head unit having a discharge port for discharging ink therethrough and an energy generating element for causing energy for discharging the ink to act on the ink, flow rate control means storing therein ink to be used in said recording head and provided with a supply port for supplying the ink to said recording head, and having a slit adapted to be closed in a steady state and to be opened for predetermined differential pressure or greater and controlling the flow rate of the ink supplied from said supply port to the outside, and pressure regulating means disposed more adjacent to said supply port than to said flow rate control means for regulating the pressure of the liquid more adjacent to the supply port than to said flow rate control means, or a head cartridge having a recording head unit having a discharge port for discharging ink therethrough and an energy generating element for causing energy for discharging the ink to act on the ink, flow rate control means storing therein ink to be used in said recording head and provided with a supply port for supplying the ink to said recording head, and having a slit adapted to be closed in a steady state and to be opened for predetermined differential pressure or greater and controlling the flow rate of the ink supplied from said supply port to the outside, and a regulation wall disposed with a predetermined clearance from said flow rate control means and more adjacent to the supply port than to said flow rate control means, or an ink jet recording head cartridge having a recording head unit having a discharge port for discharging ink therethrough and an energy generating element for causing energy for discharging the ink to act on the ink, and an ink tank unit having flow rate control means storing therein ink to be used in said recording head and provided with a supply port for supplying the ink to said recording head, and having a slit adapted to be closed in a steady state and to be opened for predetermined differential pressure or greater and controlling the flow rate of the ink supplied from said supply port to the outside, and an oscillation preventing wall disposed on that side of said flow rate control means which is adjacent to the supply port for supplying the ink from a main tank chamber to said flow rate control means.

The ink jet recording apparatus of the present invention is a recording apparatus having a recording head unit having a discharge port for discharging ink therethrough and an energy generating element for causing energy for discharging the ink to act on the ink, an ink tank unit having flow rate control means storing therein ink to be used in said recording head and provided with a supply port for supplying the ink to said recording head, and having a slit adapted to be closed in a steady state and to be opened for predetermined differential pressure or greater and controlling the flow rate of the ink supplied from said supply port to the outside, and pressure regulating means disposed more adjacent to the supply port than to said flow rate control means for regulating the pressure of the liquid more adjacent to the supply port than to said flow rate control means, and conveying means for conveying a recording medium to which said discharged ink is made to adhere, or a recording apparatus having a recording head unit having a discharge port for discharging ink therethrough and an energy generating element for causing energy for discharging the ink to act on the ink, an ink tank unit storing therein ink to be used in said recording head and provided with a supply port for supplying the ink to said recording head, and having a slit adapted to be closed in a steady state and to be opened for predetermined differential pressure or greater and controlling the flow rate of the ink supplied from said supply port to the outside, and an oscillation preventing wall disposed on that side of said flow rate control means which is adjacent to the supply port for supplying the ink from a main tank chamber to said flow rate control means, and conveying means for conveying a recording medium to which said discharged ink is made to adhere.

With such a construction, the use efficiency of liquid such as ink can be enhanced and even when the liquid solidifies under low temperatures, any unnecessary pressure will not propagate to the supply port side and there is no possibility of causing the leakage or the like of the liquid. Also the influence of the oscillation of the liquid upon the supply port side can be reduced.

DETAILED DESCRIPTION OF THE PREFERRED EMBODIMENTS

Figure 1A:
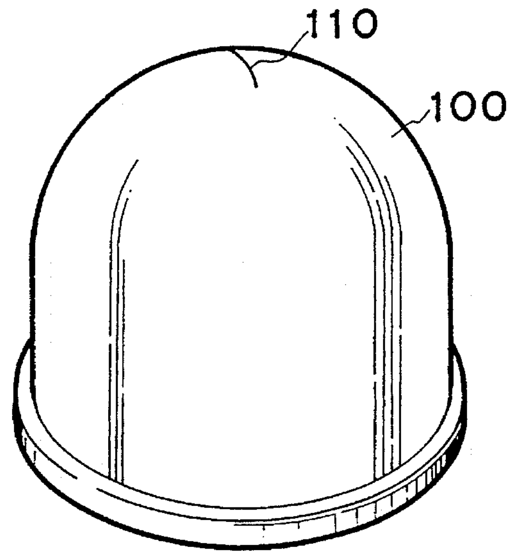
FIGS. 1A and 1B are schematic views of a slit bladder and a pressure regulating valve in a first embodiment of the present invention.
Figure 1B:
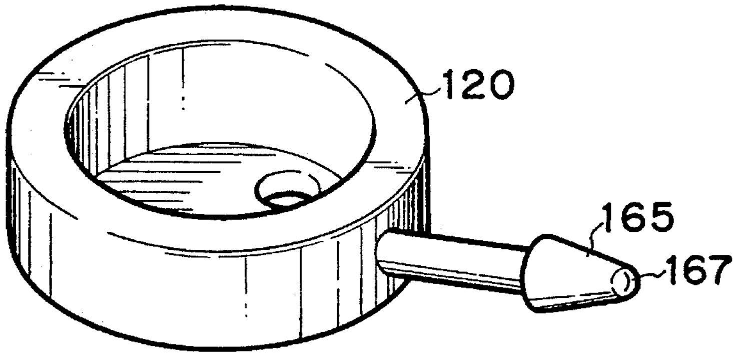
Figure 2:
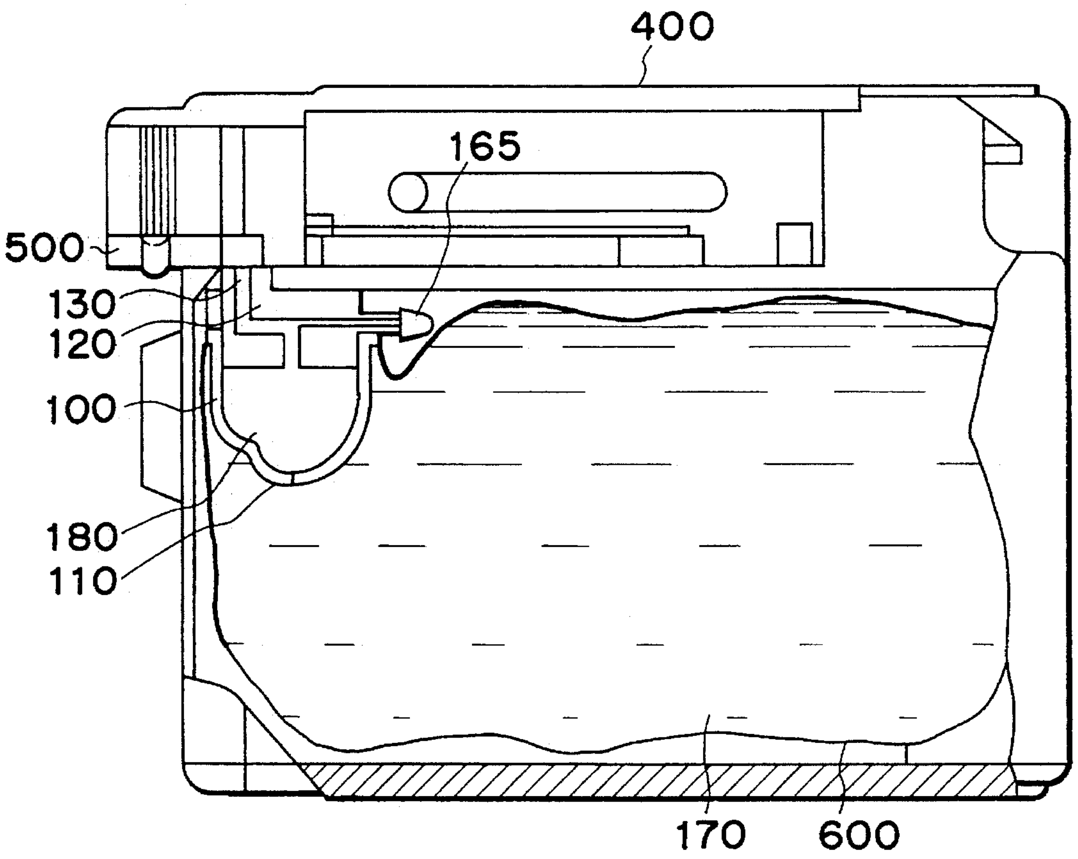
FIG. 2 is a cross-sectional view (a slit-closed state) of the pressure regulating valve in the first embodiment of the present invention as it is assembled to an ink cartridge.
Figure 3:
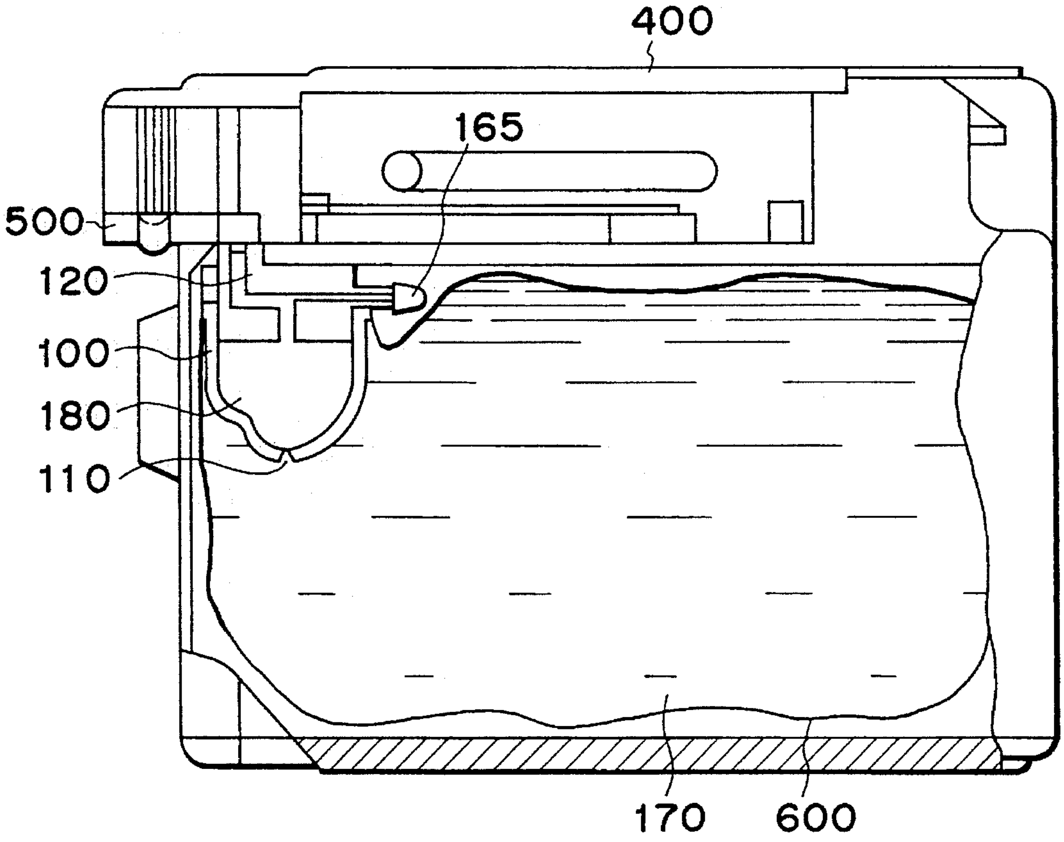
FIG. 3 is a cross-sectional view (a slit-opened state) of the pressure regulating valve in the first embodiment of the present invention as it is assembled to an ink cartridge.

Some embodiments of the present invention will hereinafter be described in detail with reference to the drawings. FIGS. 1A, 1B, 2 and 3 show an embodiment of the present invention, and FIG. 1A shows particularly a slit bladder as control means for controlling the flow rate of ink mounted on an ink tank according to the present invention, a mount bed for mounting the slit bladder thereon, and a pressure regulating value as pressure regulating means. FIGS. 2 and 3 show particularly the construction of the present invention as it is carried on the ink tank unit of a recording head cartridge in which a recording head unit and the ink tank unit are constructed integrally with each other.

In FIGS. 1A to 3, the reference numeral 100 designates a slit bladder made of an elastic material having a hardness of 15°–70° (JISA), preferably a hardness of 25°–50°. Specifically, as such elastic material, use may preferably be made of silicone rubber, SBR, BRIR, EPM or EPDM butyl rubber, chloroprene rubber, urethane rubber, fluorine rubber, nitrile rubber, acryl rubber, polysulfide rubber, ethylene rubber, fluorosilicone rubber, SEP rubber (silicone denaturated ethylene propylene rubber) or the like. Since these materials contact with liquid such as ink in the ink tank, they must not contain any substance which will vary the physical properties (such as surface tension and viscosity) of the stored liquid or which will dissolve into the stored liquid. At the same time, it is necessary that these materials do not have their physical properties varied by this liquid. Where ink is used as the liquid, this is particularly important to prevent influences upon its components, its recording characteristic, etc.

The ink jet recording ink used in the present invention consists of the following composition.

As regards dyes used as the ink used in the present invention, use can be made of almost all of water soluble acid dyes, direct dyes, basic dyes and reactive dyes listed in the color index. Also, any water soluble dyes, even if they are not listed in the color index, can be used.

Although the amount of the above-mentioned dyes used in the ink of the present invention, 0.1 to 20 percent by weight, preferably 0.3 to 10 percent by weight, more preferably 0.5 to 6 percent by weight, of the total weight of the ink is suitable.

The medium suitable for use in the ink of the present invention is water or a mixture of water and a water soluble organic solvent, and what is particularly suitable is a mixture of water and a water soluble organic solvent which contains polyatomic alcohol having the effect of preventing the desiccation of the ink. The water used should not be ordinary water containing various ions, but may preferably be deionized water.

The content of said water soluble organic solvent in the ink is generally 2 to 80 percent by weight, preferably 3 to 70 percent by weight, more preferably 4 to 40 percent by weight, of the total weight of the ink.

The rate of the water used is 35 percent by weight or more, preferably 45 percent by weight or more, of the total weight of the ink, and also, the ink of the present invention may contain, in addition to the above-mentioned components, a mildewproof agent, an antiseptic agent, a pH regulating agent, a viscosity regulating agent, a surface tension regulating agent, etc. as required.

The ink of the present invention as described above may preferably have such physical properties that the viscosity at 25° C. is 1–20 cp, preferably 1–15 cp, the surface tension is 30 dyne/cm or greater, preferably 40 dyne/cm or greater and pH is of the order of 4–10.

The reference numeral 110 denotes a slit, and the reference numeral 120 designates a mount bed for mounting the slit bladder thereon. The mount base of the mount bed is of a shape along the outer peripheral shape of the bladder base, and in the present embodiment, it is of an elliptical shape.

The slit bladder is mounted on the mount bed 120 so that the slit 110 of the slit bladder and the major axis of the ellipse of the mount bed 120 may form a right angle with each other. As a result, in the side wall of the slit bladder, tension is created in the directions of the major and minor axes of the ellipse of the mount bed 120 on which the slit bladder is mounted, and the slit can be smoothly opened by the collapse of the bladder.

However, this angle is not limited thereto if it is within the range of 0°14 55°.

FIG. 2 is a schematic cross-sectional view of an ink jet head cartridge 400 in which an ink tank unit in which the construction of the present invention such as the slit bladder is carried and an ink jet head in which an electro-thermal conversion member imparts heat energy to the ink supplied from the supply port 130 of the ink tank to thereby discharge the ink are made integral or joined with each other. The reference numeral 600 designates an ink bag for storing the ink therein. The ink bag 600 is formed of a flexible material. The reference numeral 200 denotes an atmosphere communication port. In a steady state free of any pressure difference, the slit 110 is closed and a main tank 170 and a sub-tank 180 are separated from each other. At this time, the slit bladder 100 is perfectly in its original state as shown in FIG. 1B or in a somewhat collapsed state, and liquid pressure applied to a recording head unit 500 is +30 mm hd or less. Accordingly, in this state, a balanced relation is kept between the meniscus holding force of the discharge port portion and the internal pressure of the ink tank and therefore, the ink does not leak readily due to changes in temperature and atmospheric pressure or to vibration or the like.

As liquid droplets are discharged from the recording head unit and the ink in the sub-tank 180 is consumed and decreased, the differential pressure in the sub-tank 180 becomes greater and the slit bladder 100 becomes collapsed.

When like this, the difference (differential pressure) between the pressure in the sub-tank 180 and the pressure in the main tank 170 exceeds a certain value, the slit 110 in the fore end portion of the slit bladder 100 is opened as shown in FIG. 3 by the collapse of the slit bladder 100 itself, and the ink in the main tank 170 flows into the sub-tank 180 and thus, the differential pressure between the sub-tank 180 and the main tank 170 gradually becomes smaller. With the decrease in the differential pressure between the sub-tank 180 and the main tank 170, the ink flows through the slit into the sub-tank 180, and the slit bladder 100 gradually recovers from its collapsed state and the slit 110 is closed. At this time, the sub-tank 180 is at negative pressure relative to the main tank 170. Accordingly, during printing, the slit bladder undergoes the change in the state shown in FIGS. 2 and 3, whereby the flow rake of the ink is controlled. In the steady state, the slit 110 of the slit bladder 100 is in its closed state shown in FIG. 2. On the other hand, even when the ink is temporarily sucked from the nozzle by a suction pump or the like, the differential pressure between the sub-tank 180 and the main tank 170 becomes greater as during printing and therefore, the slit 110 is opened, whereafter it restores to the steady state. To obtain stable ink droplets, the ink pressure applied to the recording head unit 500 may preferably be +30 to −200 mm hd. More preferably, it may in the range of 0 to −100 mm hd, and the pressure in the sub-tank 180 must be controlled. It is necessary to design the material (hardness) and shape of the slit bladder 100 and the shape, etc. of the slit 110 so that such conditions may be provided.

In the present embodiment, a pressure regulating valve 165 as pressure regulating means is provided on a side of the slit bladder mounting base of the mount bed 120, and even if during low temperatures, the ink is expanded in volume to thereby cause a rise of the pressure in the sub-tank 180, the pressure regulating valve slit 167 of the pressure regulating valve 165 will be opened to reduce the pressure in the slit bladder (the sub-tank chamber side) and suppress the unnecessary propagation of pressure to the recording head unit, thereby avoiding the leakage of the ink from the nozzle of the recording head. Also, it is desirable that this pressure regulating valve 165 be designed to act only in a direction to reduce pressure rise and not to act in a direction to increase the pressure when the pressure drops.

The positive pressure with which the pressure regulating valve slit 176 of the pressure regulating valve 165 is opened and closed may preferably be 10– 130 mm hd, which is smaller than the ink holding force of the nozzle of the recording head, more preferably 10–80 mm hd, because if it is not smaller than the ink holding force of the nozzle, the ink will leak from the nozzle before the pressure regulating valve slit is opened.

In the present embodiment, an elastic material is used for this pressure regulating valve, and silicone rubber, SBR, BRIR, EPM or EPDM butyl rubber, chloroprene rubber, urethane rubber, fluorine rubber, nitrile rubber, acryl rubber, polysulfide rubber, ethylene rubber or the like is suitable as such elastic material. Of course, any valve for mechanically controlling pressure in one direction may also be used to obtain a similar effect. However, these materials must not contain any substance which will vary the physical properties (such as surface tension and viscosity) of the stored liquid or which will dissolve into the liquid, because they contact with the liquid such as ink in the ink tank (the liquid storing container). At the same time, it is necessary that these materials do not have their physical properties varied by the stored liquid. This, as in the case of the aforementioned materials to be used for the slit bladder, particularly where ink is used as the liquid, is important from the influences upon its components, its recording characteristic, etc.

The ink discharged from the pressure regulating valve 165 flows into the gap between the main tank 170 containing the ink therein and the ink jet head cartridge 400, and since the quantity of the discharged ink is very slight, e.g. 0.1 cc or less, it does not leak to the outside, but as required, an absorbing member such as a porous member or laminated paper may be disposed near the exit of the pressure regulating valve 165.

As described above, the pressure regulating valve for preventing the pressure in the sub-tank from exceeding a predetermined level is provided between the sub-tank and the main tank partitioned by the slit bladder, whereby there is no possibility of the leakage of the ink which would otherwise be caused by the rise of the pressure in the sub-tank by the freezing or the like of the vibrated ink or the propagation of such pressure to the head side.

Figure 4A:
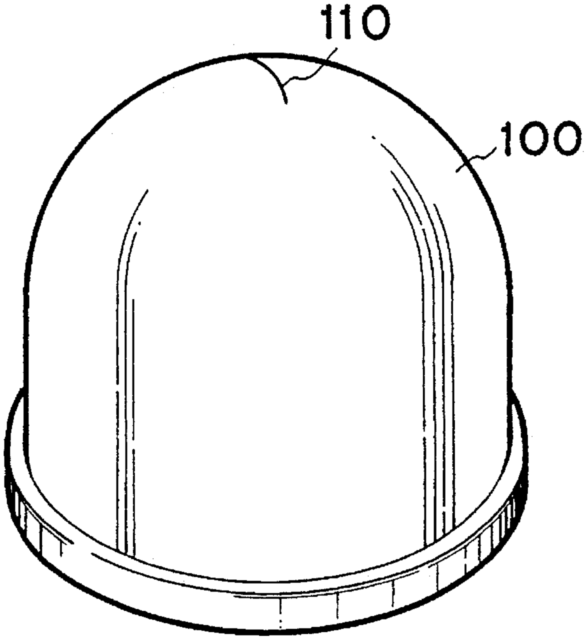
FIGS. 4A and 4B are schematic views of a slit bladder (4A) and a volume decreasing member (a regulation wall) (4B) in an embodiment of the present invention.
Figure 4B:
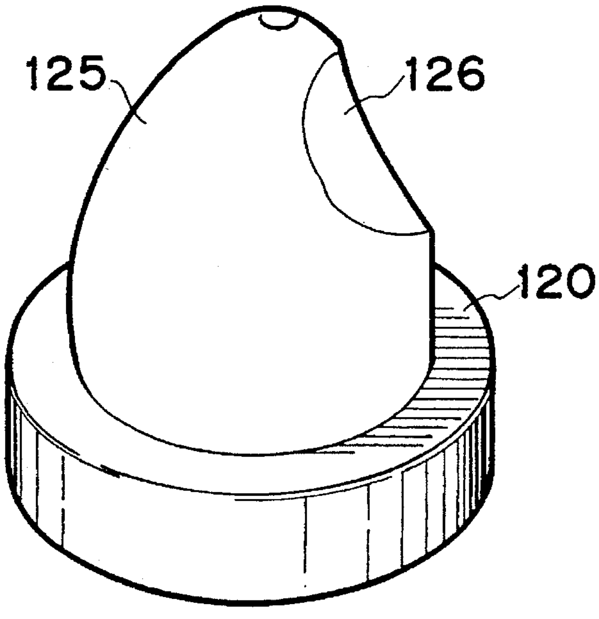

In an ink tank using a slit bladder and a recording head with the ink tank, there has been shown above an example which is provided with a pressure regulating valve as pressure regulating means for preventing the fluctuation of the pressure in the sub-tank by vibration or the freezing or the like of the ink from propagating to the head, and another embodiment for solving the above-noted problems will now be described. This embodiment is one in which the volume of the ink in the slit bladder is decreased to thereby decrease the quantity of the ink remaining in the slit bladder and increase the volume efficiency of the ink tank and further, prevent the leakage of the ink from the discharge port of the head caused by vibration, freezing or the like. FIGS. 4A and 4B schematically show an example of each of a slit bladder in the present embodiment and a mount bed therefor.

In FIGS. 4A and 4B, the reference numeral 100 designates a bladder, the reference numeral 110 denotes a slit and the reference numeral 120 designates a mount bed on which the bladder is mounted. The base of the mount bed is of a shape along the outer peripheral shape of the base of the bladder, and in the present embodiment, it is of an elliptical shape. Also, a regulation wall 125 for decreasing the quantity of ink in the slit bladder (in the sub-tank) and regulating the deformation of the slit bladder is provided on the mount bed 120, and a portion of the regulation wall has a recess 126 conforming to the deformation of the slit bladder during the creation of negative pressure.

Again, the slit bladder of the present embodiment is mounted on the mount bed 120 so that the slit 110 of the slit bladder and the major axis of the ellipse of the mount bed 120 may form a right angle.

As a result, as previously described, a difference in tension between the direction of the major axis and the direction of the minor axis of the ellipse of the mount bed 120 on which the slit bladder is mounted is created in the slit bladder, and by the collapse of the bladder, the slit can be smoothly opened.

However, this angle is not restricted thereto if it is within the range of 0°–55°.

The volume of the portion surrounded by the inner wall of the slit bladder and the afore described regulation wall (the internal volume of the sub-tank) may preferably be as small as possible, and to make said volume small, it is necessary to reduce the gap between the inner wall of the slit bladder and the outer wall of the aforedescribed regulation wall.

However, if that gap is made too small, it will become difficult to fill the gap with ink in the manufacturing process of the ink tank and therefore, productivity will become lower.

So, it is necessary to set that gap to the order of 0.3–3 mm, preferably the order of 0.3–1 mm and set the volume of the portion surrounded by the inner wall of the slit bladder and the aforedescribed regulation wall to the order of 0.05–1.5 cc, preferably on the order of 0.05–0.5 cc. Also, it is preferable to set the ratio of the volume of the portion surrounded by the inner wall of the slit bladder and the outer wall of the regulation wall to the volume of the regulation wall to 1:5– –1:0.05, preferably 1:5–1:1.

By the ink volume in the sub-tank side of the tank partitioned by the slit bladder being decreased as in the present embodiment, the quantity of ink oscillated in the sub-tank by vibration or the like can be decreased and the pressure fluctuation propagating to the head can be decreased. Also, by the ink volume in the sub-tank side being decreased, the ink volume varied during freezing or the like can be decreased to thereby reduce the pressure fluctuation.

Figure 5:
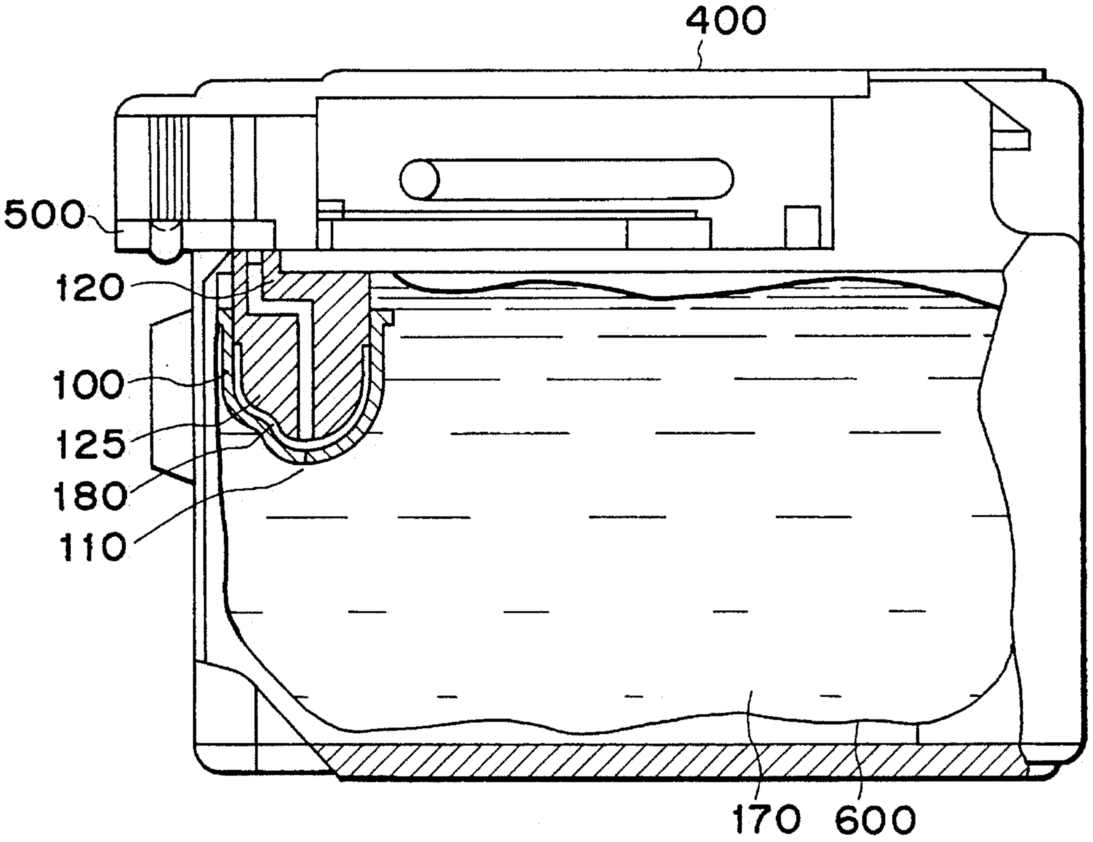
FIG. 5 is a schematic cross-sectional view (a slit-closed state) of an ink cartridge having a volume decreasing member (a regulation wall) and a slit bladder in an embodiment of the present invention.
Figure 6:
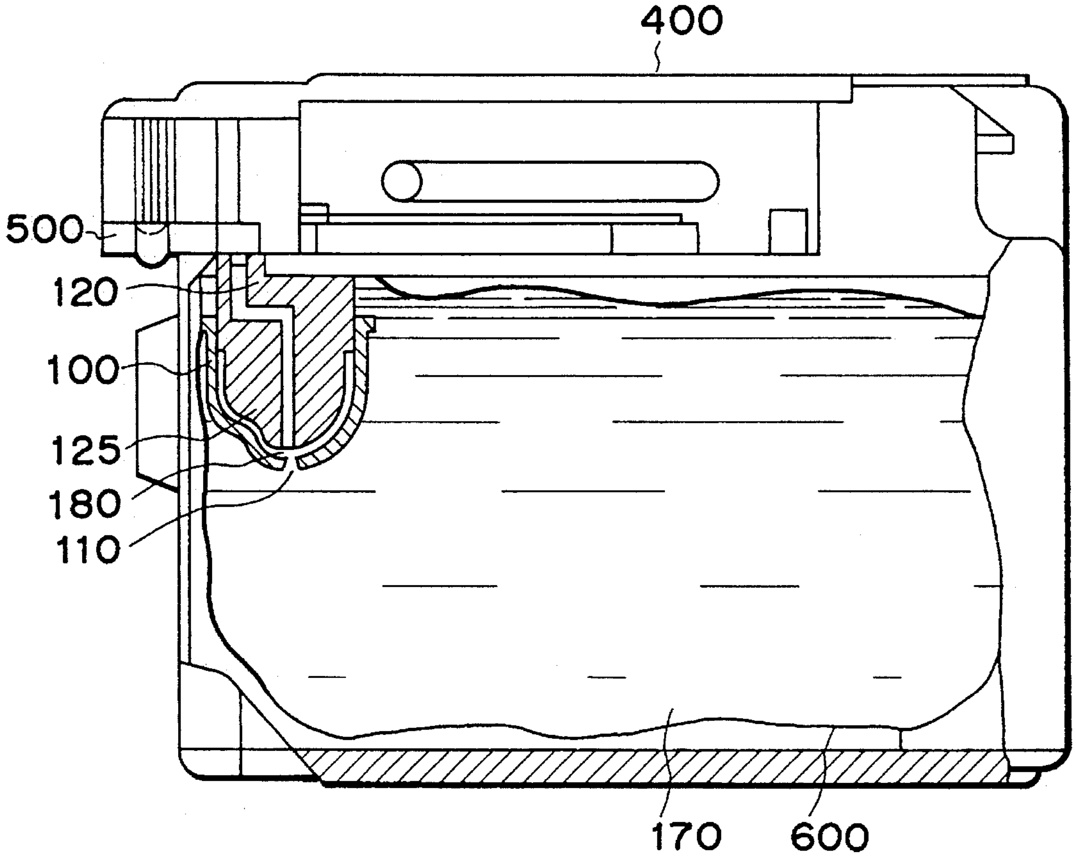
FIG. 6 is a schematic cross-sectional view (a slit-opened state) of the ink cartridge having the volume decreasing member (the regulation wall) and the slit bladder in the embodiment of the present invention.

FIGS. 5 and 6 schematically show the operative state of an ink jet recording head cartridge having an ink tank unit provided with the mechanism of the present embodiment and a recording head unit, and this cartridge operates similarly to that shown in the previous embodiment. Again in the present embodiment, the liquid storing container is similar in construction and operation to that described previously and therefore need not be described.

Figure 7A:
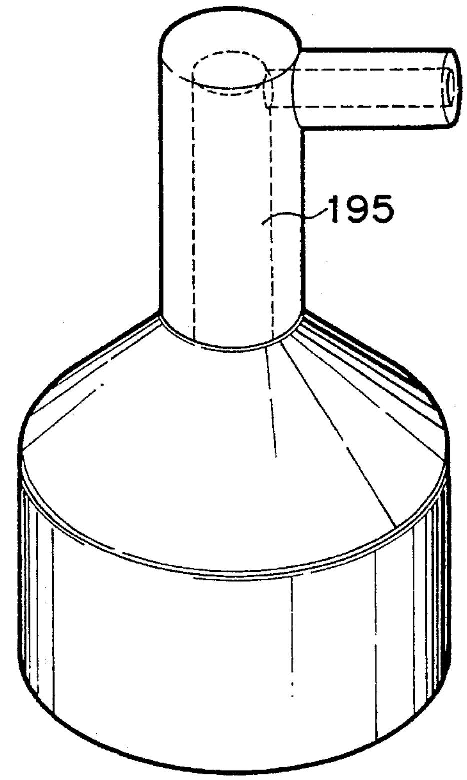
FIGS. 7A to 7C are schematic views showing the regulation wall, an oscillation preventing wall and the slit bladder in the embodiment of the present invention.
Figure 7B:
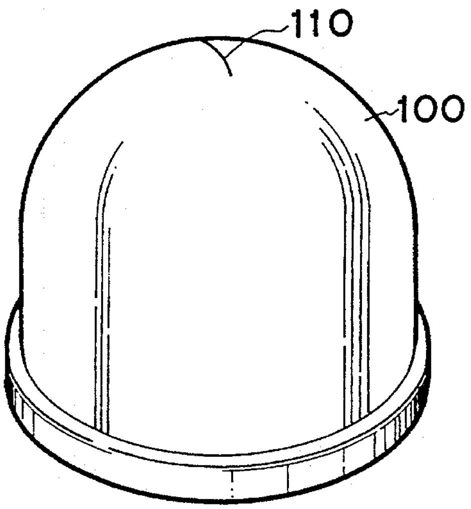
Figure 7C:
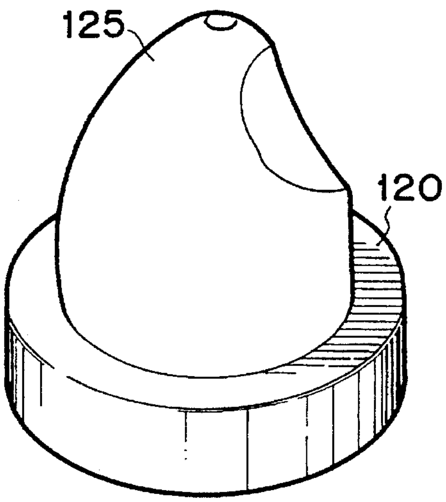

FIGS. 7A to 7C show mechanisms used in another embodiment of the present invention discretely.

In the present embodiment, an oscillation preventing wall 190 is also provided on the outer side (the main tank side) of the slit bladder.

Again in FIGS. 7A to 7C, similar portions are given similar reference numerals.

The oscillation preventing wall 190 for preventing the oscillation of the ink inside and outside the slit bladder is of a shape surrounding the configuration of the slit bladder, and serves to alleviate any variation in the pressure of the recording head unit of the ink jet head cartridge caused by the oscillation of the ink when printing is effected with the ink jet head cartridge mounted on a printer body. Also, by providing such oscillation preventing wall on the outer periphery of the aforementioned elastic member, there is obtained a deformation preventing effect. Further, in a portion of a first member covering the elastic member which is the pressure regulating means and further in a portion of the oscillation preventing wall 190, there is formed an ink flow path 195 which provides an inlet and outlet path for the ink, and the ink flow path 195 is designed such that one end thereof which is opposed to the slit bladder directs the ink to the vicinity of the inner wall of the ink tank.

Also, the volume of the portion surrounded by the outer wall of the slit bladder and the oscillation preventing wall may preferably be small to the utmost as in the case of the aforedescribed regulation wall, and to make this volume small, it is necessary to reduce the gap between the slit bladder and the oscillation preventing wall. However, if this gap is made too small, it will become difficult to fill that gap with the ink in the manufacturing process of the ink tank as in the case of the regulation wall and therefore, productivity will become lower.

So, it is desirable to set that gap to the order of 0.3–3 mm, preferably the order of 0.3– 1 mm and set the volume including the portion surrounded by the outer wall of the slit bladder and the inner wall of the oscillation preventing wall and the ink flow path to the order of 0.05–3 cc, preferably the order of 2–2 cc.

Figure 8:
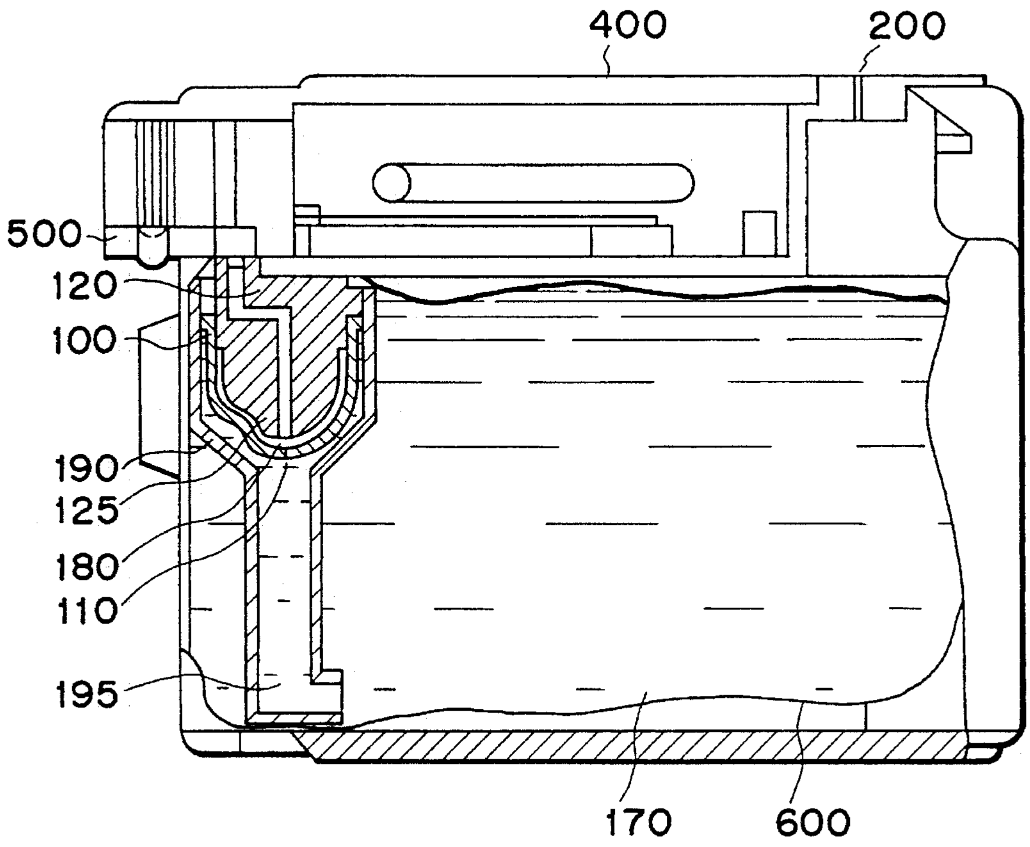
FIG. 8 is a schematic cross-sectional view (a slit-closed state) of an ink jet head cartridge having the regulation wall, the oscillation preventing wall and the slit bladder in the embodiment of the present invention.
Figure 9:
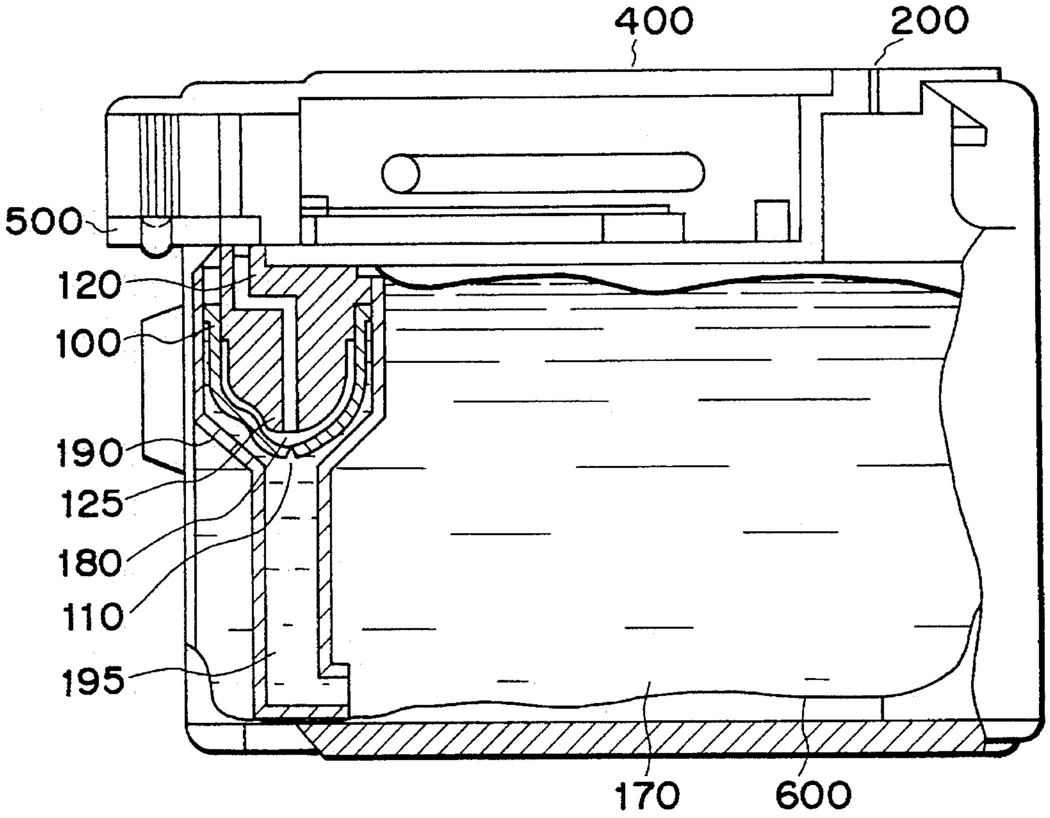
FIG. 9 is a schematic cross-sectional view (a slit-opened state) of the ink jet head cartridge having the regulation wall, the oscillation preventing wall and the slit bladder in the embodiment of the present invention.
Figure 10A:
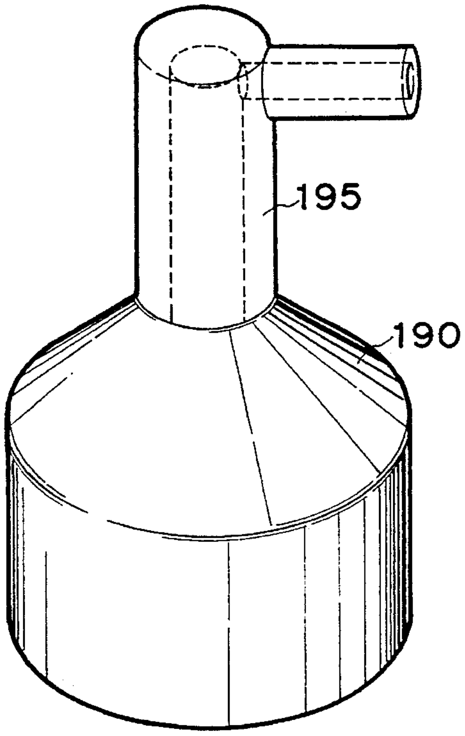
FIGS. 10A to 10C are schematic views showing a regulation wall, an oscillation preventing wall and a slit bladder in another embodiment of the present invention.
Figure 10B:
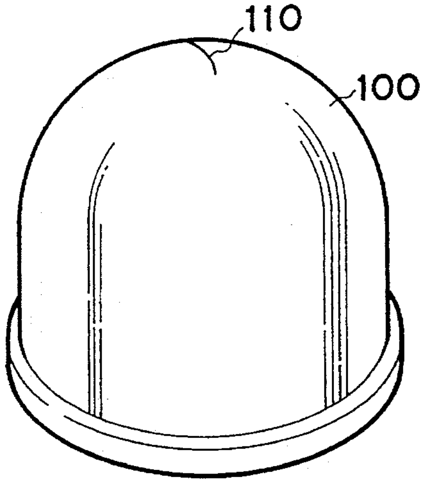
Figure 10C:
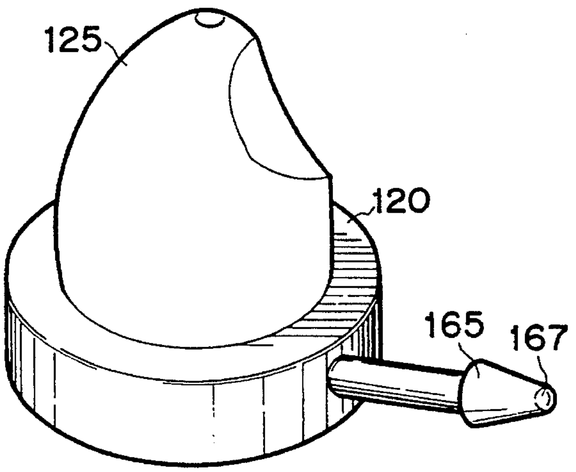
Figure 11:
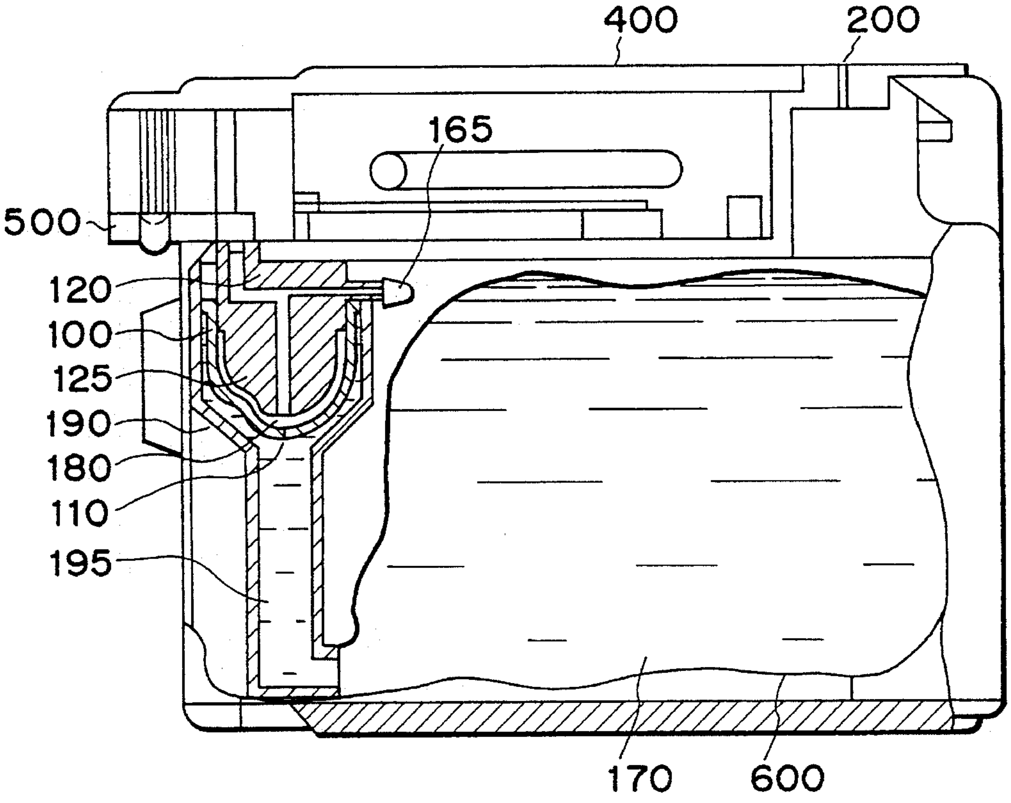
FIG. 11 is a schematic cross-sectional view (a slit-closed state) of an ink jet head cartridge having a regulation wall, an oscillation preventing wall and a slit bladder in a second embodiment of the present invention.
Figure 12:
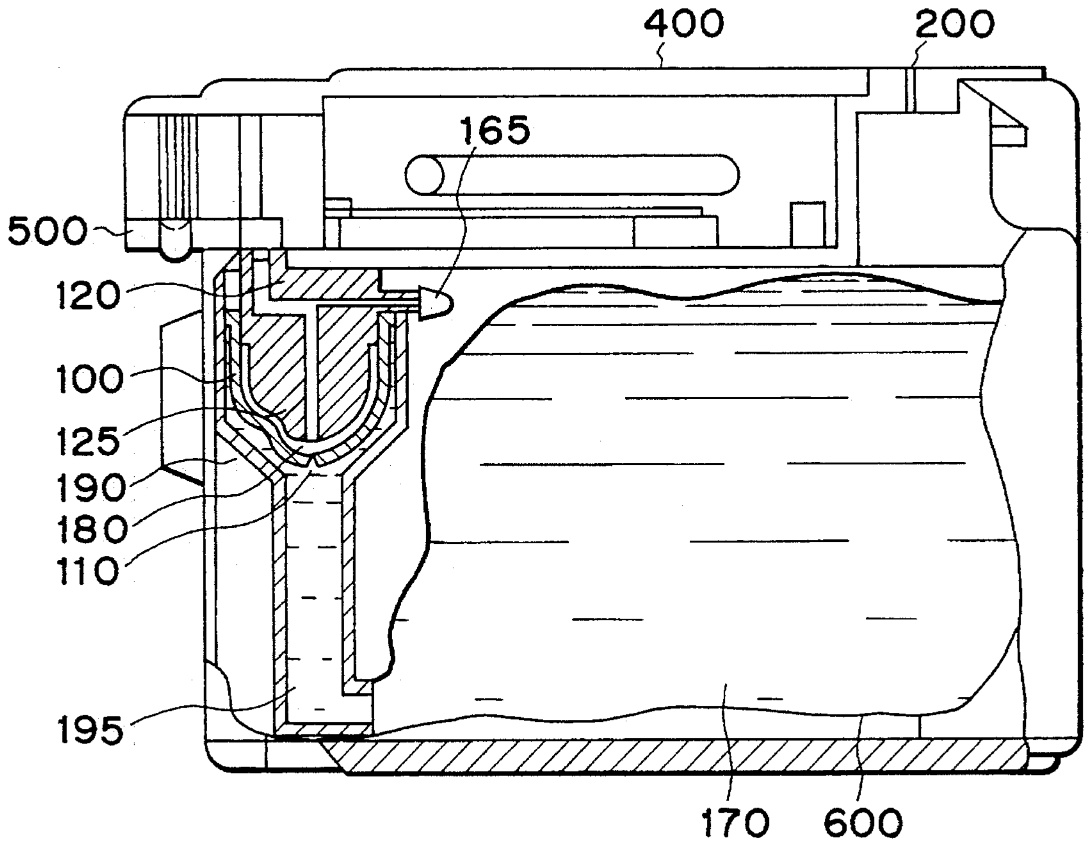
FIG. 12 is a schematic cross-sectional view (a slit-opened state) of the ink jet head cartridge having the regulation wall, the oscillation preventing wall and the slit bladder in the second embodiment of the present invention.

FIGS. 7A to 7C and 8 are schematic views showing the ink jet head cartridge of the present embodiment in which the internal volume of the bladder is decreased and the operation thereof. As in the previous embodiment, FIGS. 7A to 7C show the normal state, and FIG. 8 shows a state in which the slit bladder is operated by the pressure difference between the internal tank and the external tank.

In the present embodiment, an oscillation preventing wall and a regulation wall are provided outside and inside the slit bladder, respectively, but of course, single constructions each would also result in the obtainment of effects corresponding thereto.

By the oscillation preventing wall and the regulation wall being provided as in the present embodiment, the pressure fluctuation by vibration or the like during recording can be suppressed more efficiently and stable recording and the suppression of the leakage of the ink from the head can be accomplished.

FIGS. 10A to 10C, 11 and 12 show another embodiment of the present invention. FIG. 10 shows a slit bladder mounted in the ink tank according to the present invention, a mount bed on which it is mounted and which is provided with a regulation wall and a pressure regulating valve, and an oscillation preventing wall. FIGS. 10A to 10C and 11 show the regulation wall, the pressure regulating valve, the oscillation preventing wall and the slit bladder as they are carried in the tank unit of an ink jet head cartridge in which a recording head unit and a tank unit are constructed integrally with each other.

As in the previous embodiment, the reference numeral 110 designates a slit, and the reference numeral 120 denotes a mount bed on which a slit bladder is mounted. The base of the mount bed is of a shape along the outer peripheral shape of the base of the bladder, and in the present embodiment, it is of an elliptical shape. Also, a regulation wall 125 for reducing the quantity of ink in the slit bladder and regulating the deformation of the slit bladder is provided on the mount bed 120, and a portion of the regulation wall has a recess conforming to the deformation of the slit bladder when negative pressure is created.

The embodiment of FIGS. 10A to 10C and 11 can accomplish more stable recording and can suppress the leakage of the ink by the provision of an oscillation preventing wall 190, the regulation wall 125 for reducing the ink volume in the sub-tank and further, a pressure regulating valve.

Again in the present embodiment, as in the previous embodiment, as liquid droplets are discharged by the recording head unit and the ink in the sub-tank chamber 180 is consumed and decreased, the pressure in the sub-tank chamber 180 becomes smaller and the slit bladder 100 becomes collapsed. When like this, the difference between the pressure in the sub-tank chamber 180 and the pressure in the main tank chamber 170 exceeds a certain value, the slit 110 in the fore end portion of the slit bladder 100 is opened by the collapse of the slit bladder 100 itself as shown in FIG. 6, and the ink in the main tank chamber 170 flows into the sub-tank chamber 180, whereby the differential pressure between the sub-tank chamber 180 and the main tank chamber 170 gradually becomes smaller. With the decrease in the differential pressure between the sub-tank chamber 180 and the main tank chamber 170, the ink flows into the slit bladder via an ink flow path 195 in the oscillation preventing wall 190, whereby the slit bladder 100 gradually recovers from its collapsed state and the slit 110 is closed. At this time, the sub-tank chamber 180 is at negative pressure relative to the main tank chamber 170.

Figure 13:
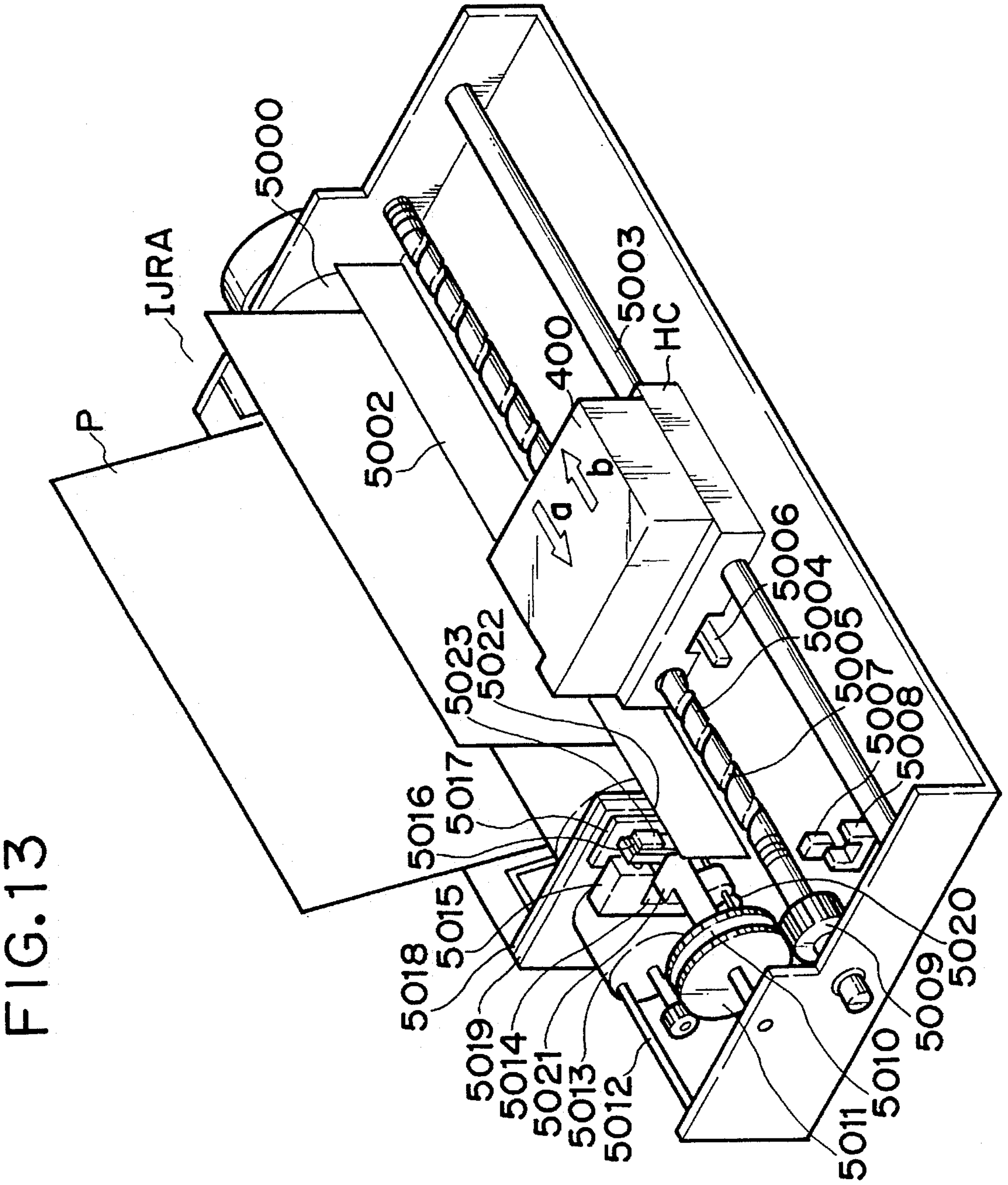
FIG. 13 is a schematic perspective view of an ink jet recording apparatus as an embodiment using the ink jet head cartridge of the present invention.
Figure 14:
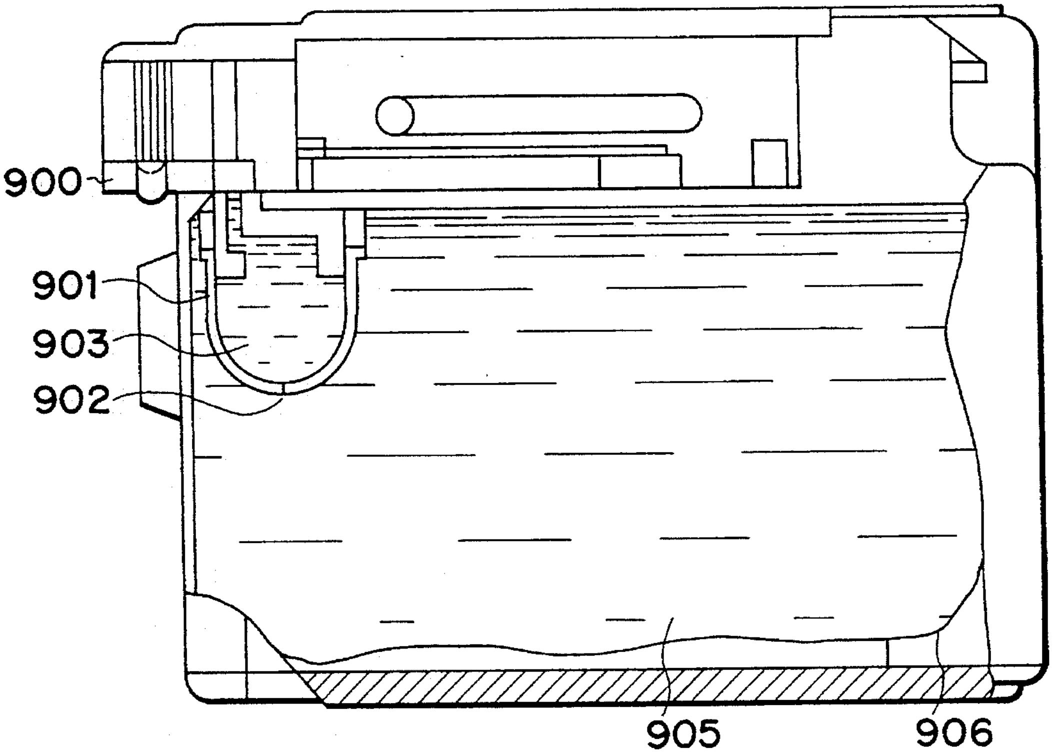
FIG. 14 is a schematic view showing an ink jet head cartridge of a type in which an ink tank provided with a slit bladder and a head are integral with each other.

FIG. 13 is a pictorial view of an ink jet recording apparatus IJRA to which the ink jet head cartridge of the present invention is applied. A carriage HC is engaged with a spiral groove 5005 on a lead screw 5004 rotated through drive force transmission gears 5011 and 5009 in operative association with the forward and reverse rotations of a drive motor 5013. The carriage HC has a pin (not shown) and is reciprocally moved in the directions of arrows a and b. An ink jet head cartridge 400 is mounted on the carriage HC. The reference numeral 5002 designates a paper keeping plate for pressing paper which is a recording medium against a platen over the directions of movement of the carriage. The reference numerals 5007 and 5008 denote photocouplers which are home position detecting means for confirming the presence of the lever 5006 of the carriage in this area and effecting the changeover or the like of the direction of rotation of a motor 5013. The reference numeral 5016 designates a member for supporting a cap member 5022 which caps the front face of a recording head, and the reference numeral 5015 denotes suction means for sucking the air in this cap member. The suction means 5015 effects the suction recovery of the recording head through an opening 5023 in the cap. The reference numeral 5017 designates a cleaning blade, and the reference numeral 5019 denotes a member for rendering this blade movable back and forth. These are supported by a body support plate 5018. Of course, the blade is not restricted to such form, but a well-known cleaning blade can be applied to the present embodiment.

The reference numeral 5012 designates a lever for starting the suction for suction recovery. The lever 5012 is moved with the movement of a cam 5020 engaged with the carriage, and the drive force from the drive motor is controlled by conventional transmission means such as clutch changeover means.

The capping, cleaning and suction recovery are designed such that when the carriage HC is positioned in the home position side area, desired processes can be carried out at positions corresponding thereto by the action of the lead screw 5004, but any design made such that desired operations are performed at well-known timing is applicable to the present embodiment.

The present invention brings about an excellent effect in a recording head or a recording apparatus of the type, particularly among the ink jet recording systems, in which provision is made of means (such as an electro-mechanical conversion member or a laser beam) generating heat energy as energy available to effect ink discharge and a change in the state of ink is caused by said heat energy.

As regards the typical construction and principle of such recording head or recording apparatus, the use of the basic principle disclosed, for example, in U.S. Pat. No. 4,723,129 and U.S. Pat. No. 4,740,796 is preferable. This system is applicable to both of the so-called on-demand type and the so-called continuous type, and particularly in the case of the on-demand type, it is effective because at least one driving signal corresponding to recording information and providing a rapid temperature rise exceeding nuclear boiling is applied to an electro-thermal conversion member disposed correspondingly to a sheet or a liquid path in which liquid (ink) is retained, thereby causing the electro-thermal conversion member to create heat energy and causing film boiling on the heat acting surface of a recording head with a result that a bubble in the liquid (ink) corresponding at one to one to said driving signal can be formed. By the growth and contraction of this bubble, the liquid (ink) is discharged through a discharge opening to thereby form at least one droplet. If this driving signal is made into a pulse shape, the growth and contraction of the bubble are accomplished appropriately on the spot and therefore, the discharge of the liquid (ink) particularly excellent in responsiveness can be accomplished, and this is more preferable. Suitable as the driving signal of such pulse shape are the driving signals as described in U.S. Pat. No. 4,463,359 and U.S. Pat. No. 4,345,262. The adoption of the conditions described in U.S. Pat. No. 4,313,124 for an invention relating to the temperature rise rate of said heat acting surface would enable more excellent recording to be accomplished.

As regards the construction of the recording head, besides the construction comprising a combination of discharge ports, liquid paths and electro-thermal conversion members (a straight liquid flow path or a right-angled liquid, flow path) as disclosed in the above-mentioned patents, the construction using U.S. Pat. No. 4,558,333 and U.S. Pat. No. 4,459,600which disclose a construction in which the heat acting portion is disposed in a bent area is also convered by the present invention. In addition, the present invention is effective for a construction based on Japanese Laid-Open Patent Application No. 59-123670 which discloses a construction in which a slit common to a plurality of electro-thermal conversion members provides the discharge portion of the electro-thermal conversion members, or Japanese Laid-Open Patent Application No. 59-138461 which discloses a construction in which an opening for absorbing the pressure wave of heat energy is made to correspond to a discharge portion.

Further, as a recording head of the full line type having a length corresponding to the width of the largest recording medium on which the recording apparatus can record, use may be made of any of a construction which satisfies said length by a combination of a plurality of recording heads as disclosed in the above-mentioned publications and a construction as a single recording head formed as a unit, and the present invention can display the above-described effect more effectively.

Also, the addition of recovery means, preliminary auxiliary means, etc. for the recording head which are provided in the construction of the recording apparatus of the present invention can more stabilize the effect of the present invention, and this is preferable. Specifically, the addition of capping means, cleaning means, pressing or suction means and an electro-thermal conversion member for the recording head or a heating element discrete from the electro-thermal conversion member or preliminary heating means comprising a combination of these and the addition of a preliminary discharge mode for effecting discharge discrete from that for recording are also effective to accomplish stable recording. Further, the recording mode of the recording apparatus is not limited to the recording mode of only the mainstream color such as black, but the recording head may be constructed as a unit or a combination of a plurality of heads, and the present invention is also very effective for an apparatus provided with a plurality of different colors or at least one of full colors by a mixture of colors.

Furthermore, the form of the ink jet recording apparatus of the present invention may be not only the form of an apparatus used as the image output end of an information processing instrument such as a computer, but also the form of a copying apparatus used in combination with a reader and further the form of a facsimile apparatus having the signal transmitting and receiving functions.

In the foregoing embodiments, the function of the present invention has been described with respect to an example in which the ink tank of the present invention and a recording head which is provided with a plurality of nozzles and in which the heat from a heater which is an electro-thermal conversion member is transmitted to the ink in the nozzles to thereby discharge the ink from a discharge port are made integral with each other or connected together, but of course, the ink tank will function even if it is not integral with the recording head. Also, this ink tank may assume a form which is connected to the recording head unit and used, whereby at a point of time whereat the ink has been consumed up, only the ink tank can be interchanged with a new one to thereby permit the repetitive use of the head and reduce the running cost of recording and also, the used ink tank can be again filled with ink and recycled. Also, where the ink tank may desirably be formed of decomposable plastics or the like so that where the ink tank once used is put into disuse, the ink tank can be readily decomposed in the earth for the preservation of the environment.

As described above, in a liquid storing tank having flow rate control means comprising an elastic member and adapted to be closed in a steady state and to be opened for predetermined differential pressure or greater, pressure regulating means adapted not to communicate for pressure below predetermined pressure and to discharge liquid to the outside for the predetermined pressure or greater is provided in the tank or a flow path connected to a supply port, whereby it becomes possible to escape any increase in pressure caused by the volume expansion of the liquid occurring from the vicinity of the solidifying point of the liquid and it becomes possible to further widen the tolerance for any temperature change.

Also, a regulation wall for decreasing the volume is provided in said flow rate control means, whereby the quantity of ink remaining in said flow rate control means can be reduced, and since said regulation wall (a volume decreasing member) serves also as regulation means for regulating the deformation of said flow rate control means, the influence of the oscillation of the liquid caused by the movement or the like of the carriage during printing can be reduced.

Further, a member (an oscillation preventing wall) convering the elastic member which is the flow rate control means is provided outside said elastic member and with a predetermined gap with respect thereto, whereby it becomes possible to reduce the quantity of liquid around said elastic member, and further alleviate the influence of the pressure fluctuation caused by the volume expansion of the liquid at low temperatures and the pressure fluctuation caused by the oscillation of the liquid occurring when the liquid storing container is mounted on an apparatus supplied with the liquid.

As a result, where the present invention is used as an ink tank for ink jet recording, the liquid pressure applied to the nozzles is usually controlled to a predetermined differential pressure range and in addition, even if the apparatus is left in the environment of the volume expansion of liquid at the solidifying point of ink or below which is not liable to occur in a normal state of use, the increase in pressure by the volume expansion of the ink can be minimized and the leakage of the ink from the head will not occur and moreover, stable discharge can be attained and thus, the tolerance of the liquid storing tank for any temperature change is further widened and the performance is remarkably improved.

Also, the present invention has a similar effect even when for some reason or other, air enters the flow path or the like and the air expands at high temperatures to thereby increase pressure.

Also, by providing a member covering the elastic member outside said elastic member and providing a volume decreasing member in said elastic member, there can be obtained the effect of preventing the deformation of said elastic member.

Further, by a flow path for directing the liquid to the vicinity of the inner wall of the liquid storing tank being formed in a portion of the member covering the elastic member which is the flow rate control means, it becomes possible to provide an ink tank and an ink jet head cartridge in which since a portion of the flow path between the liquid storing tank unit and the elastic member which is the flow rate control means is located near the outer surface of the liquid storing tank, the fore end portion of that flow path is frozen prior to the liquid storing tank unit even when the ink is frozen at low temperatures and therefore, the influence of the volume expansion caused by the freezing of the ink in the liquid storing tank unit can be completely shut off and the tolerance for any temperature change can be further widened and the leakage or the like of the ink does not occur and moreover more stable discharge can be attained, and a recording apparatus using such ink tank and such ink jet head cartridge.

What is claimed is:

1. A liquid storing container storing a liquid therein and having a supply port for supplying said liquid outside of said container, said liquid storing container comprising:

flow rate control means having a liquid supply port side and provided between said supply port and an inside of said container for blocking liquid passage to said supply port side of said flow rate control means from the inside of said container, said flow rate control means having a slit closed in a steady state and open for passing liquid therethrough when a liquid pressure inside said container exceeds a pressure at said supply port side of said flow rate control means by a predetermined differential pressure to control the flow rate of said liquid from said supply port to the outside; and pressure regulating means at said supply port side of said flow rate control means for releasing pressure at said supply port side.

2. A liquid storing container according to claim 1, wherein said flow rate control means is an elastic material.

3. A liquid storing container according to claim 1, wherein said liquid is ink for use by a recording head connected to said container.

4. A liquid storing container according to claim 3, wherein said pressure regulating means operates at a differential pressure smaller than an ink retaining force of a nozzle of said recording head.

5. A liquid storing container according to claim 4, wherein the differential pressure operating said pressure regulating means is 10–130 mm hd.

6. A liquid storing container according to claim 1, further comprising a regulation wall provided within said interior volume of said flow rate control means and having an outer wall disposed from an inner wall of said flow rate control means at a predetermined gap.

7. A liquid storing container to claim 1, further comprising an oscillation preventing wall for supplying ink from a main chamber of said container to said flow rate control means, said oscillation preventing wall being disposed on a side of said flow rate control means opposed to said supply port side.

8. An ink jet head cartridge for discharging an ink, said ink jet head cartridge comprising:

a recording head unit having a nozzle for discharging the ink therethrough and an energy generating element for causing energy for discharging the ink to act thereon; and an ink tank unit having a supply port side and provided storing therein ink for use by said recording head unit and having said supply port for supplying said ink outside said ink tank unit to said recording head unit, wherein said ink tank unit includes flow rate control means between said supply port and the inside of said ink tank unit for blocking ink passage to a supply port side of said flow control means from the inside of said ink tank unit, said flow rate control means having a slit closed in a steady state and open for passing ink therethrough when an ink pressure inside said ink tank unit exceeds a pressure at said supply port side of said flow rate control means by a predetermined differential pressure to control the flow rate of said ink supplied from said supply port to the outside, and pressure regulating means at said supply port side of said flow rate control means for releasing pressure at said supply port side.

9. An ink jet head cartridge according to claim 8, wherein said flow rate control means is an elastic material.

10. An ink jet head cartridge according to claim 8, wherein said pressure regulating means operates at a differential pressure smaller than an ink retaining force of the nozzle of said recording head unit.

11. An ink jet head cartridge according to claim 10, wherein the differential pressure operating said pressure regulating means is 10–130 mm hd.

12. An ink jet recording apparatus for discharging an ink to thereby effect recording, said ink jet recording apparatus comprising:

a recording head unit having a discharge port for discharging the ink therethrough and an energy generating element for causing energy for discharging the ink to act thereon;

an ink tank unit storing therein ink for use by said recording head unit and having a supply port for supplying said ink outside said ink tank unit to said recording head unit, wherein said ink tank unit includes flow rate control means having an interior volume and a liquid supply port side and provided between said supply port and inside of said ink tank unit for blocking ink passage to said supply port side of said flow rate control means from the inside of said ink tank unit, said flow rate control means having a slit closed in a steady state and open for passing ink therethrough when an ink pressure inside said ink tank unit exceeds a pressure at said supply port side of said flow rate control means by a predetermined differential pressure to control the flow rate of said ink from said supply port to the outside, and pressure regulating means at said supply port side of said flow rate control means for releasing pressure at said supply port side and conveying means for conveying a recording medium to a location at which ink is discharged by said recording head unit.

13. An ink jet recording apparatus according to claim 12, wherein said ink tank unit further includes a regulation wall provided with said interior volume of said flow rate control means and having an outer wall disposed from an inner wall of said flow rate control means at a predetermined gap disposed with a predetermined gap from said flow rate control means at said supply port side of said flow rate control means.

14. An ink jet recording apparatus according to claim 12, wherein said ink tank further includes an oscillation preventing wall for supplying ink from a main tank chamber of said ink tank unit to opposed to said supply port side.

15. A liquid storing container storing a liquid therein and having a supply port for supplying said liquid to the outside of said container, said liquid storing container comprising:

flow rate control means having an interior volume and liquid supply port side and provided between said supply port and an inside of said container for blocking ink passage to said supply port side of said flow rate control means from the inside of said container said flow rate control means having a slit closed in a steady state and open for passing ink therethrough when a liquid pressure inside said container exceeds a pressure at said supply port side of said flow rate control means by a predetermined differential pressure to control the flow rate of said liquid from said supply port to the outside; and a regulation wall provided within said interior volume of said flow rate control means and having an outer wall disposed from an inner wall of said flow rate control means at a predetermined gap.

16. A liquid storing container according to claim 15 wherein said flow rate control means is an elastic material.

17. A liquid storing container according to claim 15, wherein said liquid is ink for use by a recording head connected to said container.

18. A liquid storing container according to claim 15, wherein said gap is 0.3 to 3 mm.

19. A liquid storing container according to claim 15, wherein a volume of liquid in said gap is 0.05–1.5 cc.

20. An ink jet head cartridge for discharging an ink, said ink jet head cartridge comprising:

a recording head unit having a discharge port for discharging the ink therethrough and an energy generating element for causing energy for discharging the ink to act thereon; and an ink tank unit storing therein ink for use by said recording head unit and having a supply port for supplying said ink outside said ink tank unit to said recording head unit, wherein said ink tank unit includes flow rate control means having an interior volume and a liquid supply port side and provided between said supply port and an inside of said ink tank unit for blocking ink passage to said supply port side of said flow rate control means from the inside of said ink tank unit, said flow rate control means having a slit closed in a steady state and open for passing ink therethrough when an ink pressure inside said ink tank unit exceeds a pressure at said supply port side of said flow rate control means by a predetermined differential pressure to control the flow rate of said ink supplied from said supply port to the outside, and a regulation wall provided within said interior volume of said flow rate control means and having an outer wall disposed from an inner wall of said flow rate control means at a predetermined gap.

21. An ink jet head cartridge according to claim 20, wherein said gap unit is 0.3 to 3 mm.

22. An ink jet head cartridge according to claim 20, wherein a volume of ink in said gap is 0.05–1.5 cc.

23. An ink jet recording apparatus for discharging an ink to thereby effect recording, said ink jet recording apparatus comprising:

a recording head unit having a discharge port for discharging the ink therethrough and an energy generating element for causing energy for discharging the ink to act on an ink tank unit storing therein ink for use by said recording head unit and having a supply port for supplying said ink outside said ink tank unit to said recording head unit, wherein said ink tank unit includes flow rate control means having an interior volume and a liquid supply port side and provided between said supply port and an inside of said ink tank unit for blocking ink passage to said supply port side of said flow rate control means from the inside of said container, said flow rate control means having a slit closed in a steady state and open for passing ink therethrough when an ink pressure inside said ink tank unit exceeds a pressure at said supply port side of said flow rate control means by a predetermined differential pressure to control the flow rate of said ink supplied from said supply port to the outside, and a regulation wall provided within said interior volume of said flow rate control means and having an outer wall disposed from an inner wall of said flow rate control means at a predetermined gap; and conveying means for conveying a recording medium to a location at which ink is discharged by said recording head unit.

24. A liquid storing container storing a liquid therein and having a supply port for supplying said liquid to the outside of said container, said liquid storing container comprising:

flow rate control means having a liquid supply port side and provided between said supply port and an inside of said container for blocking liquid passage to said supply port side of said flow rate control means from the inside of said container, said flow rate control means having a slit closed in a steady state and open for passing liquid therethrough when a liquid pressure inside said container exceeds a pressure at said supply port side of said flow rate control means by a predetermined differential pressure to control the flow rate of said liquid from said supply port to the outside; and an oscillation preventing wall for supplying liquid from a main chamber of said container to said flow rate control means, said oscillation preventing wall being disposed on a side of said flow rate control means opposed to said supply port side.

25. An ink jet head cartridge for discharging an ink, said ink jet head cartridge comprising:

a recording head unit having a discharge port for discharging the ink therethrough and an energy generating element for causing energy for discharging the ink to act thereon; and an ink tank unit storing therein ink for use by said recording head unit and having a supply port for supplying said ink outside said ink tank unit to said recording head unit, wherein said ink tank unit includes flow rate control means having a liquid supply port side and provided between said supply port and an inside of said ink tank unit for blocking ink passage to said supply port side of said flow rate control means from the inside of said ink tank unit, said flow rate control means having a slit closed in a steady state and open for passing ink therethrough when an ink pressure inside said ink tank unit exceeds a pressure at said supply port side of said flow rate control means by a predetermined differential pressure to control the flow rate of said ink supplied from said supply port to the outside, and an oscillation preventing wall for supplying ink from a main tank chamber of said ink tank unit to said flow rate control means, said oscillation preventing wall being disposed on a side of said flow rate control means opposed to said supply port side.

26. An ink jet recording apparatus for discharging an ink to thereby effect recording, said ink jet recording apparatus comprising:

a recording head unit having a discharge prot for discharging the ink therethrough and an energy generating element for causing energy for discharging the ink to act thereon;

an ink tank unit storing therein ink for use by said recording head unit and having a supply port for supplying said ink outside said ink tank unit to said recording head unit, wherein said ink tank unit includes flow rate control means having a liquid supply port side and provided between said port and an inside of said ink tank unit for blocking ink passage to said supply port side of said flow rate control means from the inside of said ink tank unit, said flow rate control means having a slit closed in a steady state and open for passing ink therethrough when an ink pressure inside said ink tank unit exceeds a pressure at said supply port side of said flow rate control means by predetermined differential pressure to control the flow rate of said ink supplied from said supply port to the outside, and an oscillation preventing wall for supplying ink from a main tank chamber of said ink tank unit to said flow rate control means, said oscillation preventing wall being disposed on a side of said flow rate control means opposed to said supply port side; and conveying means for conveying a recording medium to a location at which ink is discharged by said recording head unit.

27. A liquid storing container comprising:

flow rate control means including a deformable elastic bladder having an interior volume and a normally closed slit for controlling a flow of liquid between a first section and a second section of said liquid storing container, wherein said slit opens when a pressure difference between said first section and said second section is greater than a predetermined value;

one-way check valve pressure regulating means for regulating pressure in said liquid storing container; and regulating wall provided within said interior volume of said elastic bladder for limiting an amount of deformation of said elastic bladder and for decreasing an amount of space between said elastic bladder and an ink supply portion.

28. A liquid storing container comprising:

flow rate control means including a deformable elastic bladder having a slit for controlling a flow of liquid between a first section and a second section of said liquid storing container, wherein said slit opens when a pressure difference between said first section and said second section is greater than a predetermined value;

one-way check valve pressure regulating means for regulating pressure in said liquid storing container; and an oscillation preventing wall surrounding said flow rate control means for preventing an oscillation of liquid in said container from being transferred to said flow rate control means.

29. A liquid storing container comprising:

flow rate control means including a deformable elastic bladder having an interior volume and a normally closed slit for controlling a flow of liquid between a first section and a second section of said liquid storing container, wherein said slit opens when a pressure difference between said first section and said second section is greater than a predetermined pressure;

one-way check valve pressure regulating means for regulating pressure in said liquid storing container;

a regulating wall provided within said interior volume of said elastic bladder for limiting an amount of deformation of said elastic bladder and for decreasing an amount of space between said elastic bladder and an ink supply portion; and an oscillation preventing wall surrounding said flow rate control means for preventing an oscillation of liquid in said container from being transferred to said flow rate control means.

* * * * *

UNITED STATES PATENT AND TRADEMARK OFFICE
CERTIFICATE OF CORRECTION

PATENT NO. : 5,479,198

DATED : December 26, 1995

INVENTORS : KENJI KAWANO ET AL.

It is certified that error appears in the above-identified patent and that said Letters Patent is hereby corrected as shown below:

ON TITLE PAGE

In [56] ABSTRACT:

Line 1, "liquid," should read --liquid--.

COLUMN 1

Line 26, "the" should be deleted.

Line 61, "container" should read --container,--.

COLUMN 6

Line 44, "0°14 55°." should read --0°-55°.--.

COLUMN 7

Line 19, "rake" should read --rate--;
Line 28, "may" should read --may be--.

UNITED STATES PATENT AND TRADEMARK OFFICE
CERTIFICATE OF CORRECTION

PATENT NO. : 5,479,198

DATED : December 26, 1995

INVENTORS : KENJI KAWANO ET AL.

It is certified that error appears in the above-identified patent and that said Letters Patent is hereby corrected as shown below:

COLUMN 13

Line 19, "consumed up," shold read --consumed,--.

COLUMN 14

Line 56, "head" should read --head, including a nozzle,--;
Line 60, "a" should read --said--.

COLUMN 15

Line 3, "to" should read --according to--;
Line 14, "having a supply port side and provided" should be deleted;
Line 16, "said supply" should read --a supply--;
Line 19, "means" should read --means having a liquid supply port side and provided-- and "the" should be deleted;
Line 20, "a" should read --said--;
Line 63, "side" should read --side;--.

UNITED STATES PATENT AND TRADEMARK OFFICE
CERTIFICATE OF CORRECTION

PATENT NO. : 5,479,198

DATED : December 26, 1995

INVENTORS : KENJI KAWANO ET AL.

It is certified that error appears in the above-identified patent and that said Letters Patent is hereby corrected as shown below:

COLUMN 16

Line 3, "with" should read --within--;
Line 5, "gap" should read --gap.--;
Lines 6-8, the lines should be deleted.
Line 11, "to opposed" should read --to said flow rate control means, said oscillation preventing wall being disposed on a side of said flow rate control means opposed--;
Line 15, "and" should read --and a--;
Line 19, "container" should read --container,--;
Line 30, "claim 15" should read --claim 15,--;
Line 67, "unit" should be deleted.

UNITED STATES PATENT AND TRADEMARK OFFICE

CERTIFICATE OF CORRECTION

PATENT NO. : 5,479,198

DATED : December 26, 1995

INVENTORS : KENJI KAWANO ET AL.

It is certified that error appears in the above-identified patent and that said Letters Patent is hereby corrected as shown below:

<u>COLUMN 17</u>

Line 8, "on" should read--thereon;--.

<u>COLUMN 18</u>

Line 13, "prot" should read --port--;
Line 29, "by" should read --by a--;
Line 50, "regulating" should read --a regulating--.

Signed and Sealed this

Eleventh Day of June, 1996

Attest:

BRUCE LEHMAN

*Attesting Officer* *Commissioner of Patents and Trademarks*